(12) United States Patent
Ohgake

(10) Patent No.: US 7,254,102 B2
(45) Date of Patent: Aug. 7, 2007

(54) METHOD FOR OPTICALLY RECORDING INFORMATION ACCORDING TO A STRATEGY AND COMPUTER-READABLE RECORDING MEDIUM FOR CAUSING A COMPUTER TO OPTICALLY RECORD INFORMATION ACCORDING TO A STRATEGY

(75) Inventor: Mitsuru Ohgake, Chiba (JP)

(73) Assignee: Ricoh Company, Ltd., Tokyo (JP)

( * ) Notice: Subject to any disclaimer, the term of this patent is extended or adjusted under 35 U.S.C. 154(b) by 733 days.

(21) Appl. No.: 09/916,292

(22) Filed: Jul. 30, 2001

(65) Prior Publication Data

US 2002/0021638 A1 Feb. 21, 2002

(30) Foreign Application Priority Data

Aug. 14, 2000 (JP) ............... 2000-245601

(51) Int. Cl.
*G11B 7/00* (2006.01)
(52) U.S. Cl. ............... 369/47.55; 369/47.51; 369/53.22
(58) Field of Classification Search ............ 369/47.55, 369/53.22, 53.37, 47.51, 47.53
See application file for complete search history.

(56) References Cited

U.S. PATENT DOCUMENTS

| | | | | |
|---|---|---|---|---|
| 5,072,435 A | * | 12/1991 | Bakx | 369/47.53 |
| 5,226,027 A | * | 7/1993 | Bakx | 369/47.55 |
| 5,289,451 A | * | 2/1994 | Ashinuma et al. | 369/47.55 |
| 5,502,702 A | * | 3/1996 | Nakajo | 369/53.22 |
| 2002/0080702 A1 | | 6/2002 | Asada et al. | |

FOREIGN PATENT DOCUMENTS

| | | |
|---|---|---|
| EP | 0 442 566 A- | 8/1991 |
| EP | 0 469 727 A- | 2/1992 |
| EP | 1 094 449 A- | 4/2001 |
| JP | H11-279077 | 10/1999 |
| JP | H11-283249 | 10/1999 |
| JP | 2000-099949 | 4/2000 |

OTHER PUBLICATIONS

Patent Abstracts of Japan, vol. 1997, No. 01, Jan. 31, 1997 & JP 08 249662 A (RICOH Co Ltd), Sep. 27, 1996.
Decision of Rejection of Patent Application No. 2000-245601 (date of issue: Jan. 30, 2007).

* cited by examiner

*Primary Examiner*—Andrea Wellington
*Assistant Examiner*—Peter Vincent Agustin
(74) *Attorney, Agent, or Firm*—Dickstein Shapiro LLP

(57) ABSTRACT

In a method for optically recording information in a system including a recording and reading device that includes a strategy part for conducting a strategy when optically recording information and an information processing apparatus that includes a strategy information storing part storing the strategy information for operating the strategy part, the strategy information for operating the strategy part of the recording and reading device is read from the strategy information storing part of the information processing apparatus and the strategy information is transmitted to the recording and reading device.

8 Claims, 12 Drawing Sheets

FIG.2

| DEVICE INFORMATION | MEDIUM INFORMATION | STRATEGY INFORMATION |
|---|---|---|
| D1 | M1 | S-D1M1 |
| D1 | M2 | S-D1M2 |
| ⋮ | ⋮ | ⋮ |
| D1 | Mm | S-D1Mm |
| ⋮ | ⋮ | ⋮ |
| Dd | M1 | S-DdM1 |
| Dd | M2 | S-DdM2 |
| ⋮ | ⋮ | ⋮ |
| Dd | Mm | S-DdMm |
|  | SM | S-DM |

FIG.5

| MEDIUM INFORMATION | STRATEGY INFORMATION |
|---|---|
| M1 | S-D1M1 |

FIG.6

| MEDIUM INFORMATION | STRATEGY INFORMATION |
|---|---|
| M1 | S-D1M1 |
| M3 | S-D1M3 |
| M5 | S-D1M5 |
| M6 | S-D1M6 |
|  |  |
|  |  |

FIG.8

| DEVICE INFORMATION | MEDIUM INFORMATION | REGISTRATION INFORMATION (REGISTERED DATE) | STRATEGY INFORMATION |
|---|---|---|---|
| D1 | M1 | 1999.10 | S-D1M1 |
| D1 | M2 | 1999.10 | S-D1M2 |
| ... | ... | ... | ... |
| D1 | Mm | 1999.05 | S-D1Mm |
| ... | ... | ... | ... |
| Dd | M1 | 2000.01 | S-DdM1 |
| Dd | M2 | 2000.01 | S-DdM2 |
| ... | ... | ... | ... |
| Dd | Mm | 2000.05 | S-DdMm |
| Dd | SM | 1999.01 | S-DM |

FIG.9

| DEVICE INFORMATION | REGISTRATION INFORMATION (REGISTERED DATE) | STRATEGY INFORMATION |
|---|---|---|
| M1 | 1999.10 | S-D1M1 |
| M3 | 1999.05 | S-D1M3 |
| M5 | 1999.05 | S-D1M5 |
| M6 | 2000.04 | S-D1M6 |

FIG.11

| DEVICE INFORMATION | MEDIUM INFORMATION | REGISTRATION INFORMATION (REPLACEMENT PERMISSION) | STRATEGY INFORMATION |
|---|---|---|---|
| D1 | M1 | NO | S-D1M1 |
| D1 | M2 | YES | S-D1M2 |
| ... | ... | ... | ... |
| D1 | Mm | NO | S-D1Mm |
| ... | ... | ... | ... |
| Dd | M1 | NO | S-DdM1 |
| Dd | M2 | YES | S-DdM2 |
| ... | ... | ... | ... |
| Dd | Mm | NO | S-DdMm |
| | SM | YES | S-DM |

FIG.12

| DEVICE INFORMATION | REGISTRATION INFORMATION (PERMISSION TO REPLACE) | STRATEGY INFORMATION |
|---|---|---|
| M1 | NO | S-D1M1 |
| M3 | YES | S-D1M3 |
| M5 | NO | S-D1M5 |
| M6 | YES | S-D1M6 |

FIG.13

| DEVICE INFORMATION | REGISTRATION INFORMATION (EXPIRATION DATE) | USE NUMBER | STRATEGY INFORMATION |
|---|---|---|---|
| M1 | 1999.10 | 200 | S-D1M1 |
| M3 | 1999.05 | 400 | S-D1M3 |
| M5 | 1999.05 | 300 | S-D1M5 |
| M6 | 2000.04 | 100 | S-D1M6 |

FIG.14

| DEVICE INFORMATION | REGISTRATION INFORMATION (PERMISSION TO REPLACE) | USE NUMBER | STRATEGY INFORMATION |
|---|---|---|---|
| M1 | NO | 200 | S-D1M1 |
| M3 | YES | 400 | S-D1M3 |
| M5 | NO | 300 | S-D1M5 |
| M6 | YES | 100 | S-D1M6 |

METHOD FOR OPTICALLY RECORDING INFORMATION ACCORDING TO A STRATEGY AND COMPUTER-READABLE RECORDING MEDIUM FOR CAUSING A COMPUTER TO OPTICALLY RECORD INFORMATION ACCORDING TO A STRATEGY

BACKGROUND OF THE INVENTION

1. Field of the Invention

The present invention generally relates to a method for optically recording information to an optical disk and a computer-readable recording medium for causing a computer to optically record information.

2. Description of the Related Art

Recently, since optical disks capable of recording information have been developed, information processed by an information processing apparatus such as a personal computer or the like are recorded to an optical disk by a recording and reading device.

In order to record information to the optical disk, write pulses forming a 3T through 11T bit of an EFM (Eight to Fourteen bit Modulation) are emitted to the optical disk and then information is recorded.

A strategy process for compensating the write pulses forming the 3T bit through 11T bit is conducted to read the information written on the optical disk without any error.

It is required for the strategy process to correspond to a recording material of the optical disk and the recording and reading device.

SUMMARY OF THE INVENTION

It is a general object of the present invention to provide a method for optically recording information to an optical disk and a computer-readable recording medium for causing a computer to optically record information in which the above-mentioned problems are eliminated.

A more specific object of the present invention is to provide the method for optically recording information to an optical disk and the computer-readable recording medium for causing a computer to optically record information, in which information can be recorded to a medium by an optimum strategy corresponding to the medium and a recording and reading apparatus.

The above objects of the present invention are achieved by a method for optically recording information in a system including a recording and reading device that includes a strategy part for conducting a strategy when optically recording information and an information processing apparatus that includes a strategy information storing part storing the strategy information for operating the strategy part, the method including the steps of: (a) reading the strategy information for operating the strategy part of the recording and reading device from the strategy information storing part of the information processing apparatus; and (b) transmitting the strategy information read in the step (a) to said recording and reading device.

According to the present invention, it is possible to provide the method that can optimize to record information to the optical recording medium based on the strategy information transmitted from the information processing apparatus.

The above objects of the present invention are achieved by a computer-readable recording medium recorded with program code for causing a computer to optically record information in a system comprising a recording and reading device that includes a strategy part for conducting a strategy when optically recording information and an information processing apparatus that includes a strategy information storing part storing the strategy information for operating said strategy part, said program including the codes for: (a) reading said strategy information for operating said strategy part of said recording and reading device from said strategy information storing part of said information processing apparatus; and (b) transmitting said strategy information read by said code (a) to said recording and reading device.

According to the present invention, it is possible to provide the computer-readable recording medium recorded with program code for causing a computer to optically record information in that information can be recorded to the optical recording medium based on the strategy information transmitted from the information processing apparatus.

In the following, embodiments of the present invention will be described with reference to the accompanying drawings.

BRIEF DESCRIPTION OF THE DRAWINGS

FIG. 2 is a diagram showing a table example for device information according to the first embodiment of the present invention;

FIG. 5 is a diagram showing a record example of strategy information of a strategy part according to the first embodiment of the present invention;

FIG. 6 is a diagram showing a record example of the strategy information of the strategy part according to a second embodiment of the present invention;

FIG. 8 is a table showing information structure example of a strategy information storing part according to a third embodiment of the present invention;

FIG. 9 is a diagram showing a record example of the strategy information of the strategy part according to the third embodiment of the present invention;

FIG. 11 is a table showing another information structure example of the strategy information storing part according to the third embodiment of the present invention;

FIG. 12 is a diagram showing another record example of the strategy information of the strategy part according to the third embodiment of the present invention;

FIG. 13 is a diagram showing a record example of the strategy information of the strategy part according to a fourth embodiment of the present invention;

FIG. 14 is a diagram showing another record example of the strategy information of the strategy part according to the fourth embodiment of the present invention.

DESCRIPTION OF THE PREFERRED EMBODIMENTS

First Embodiment

Figure 1:
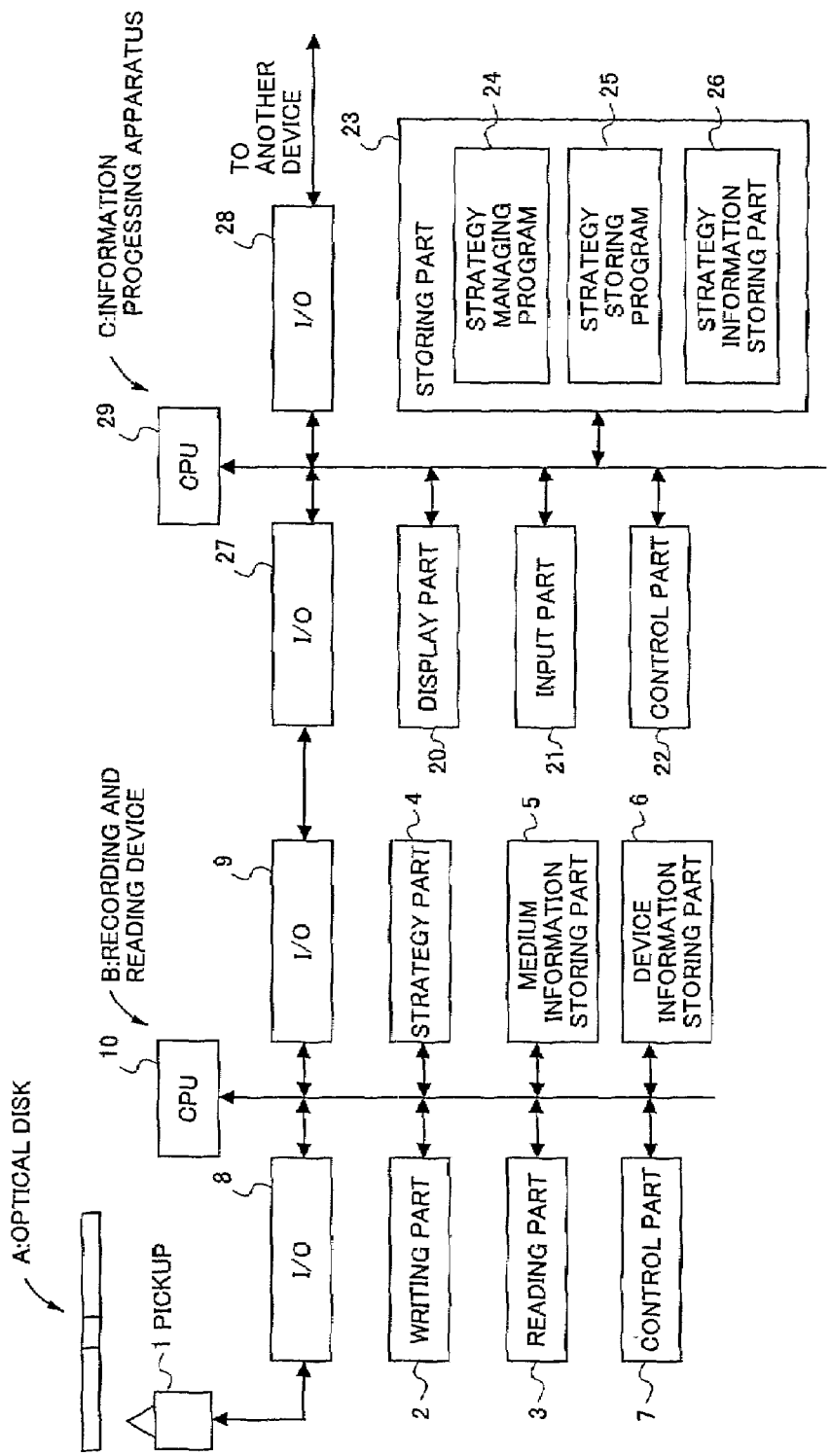
FIG. 1 is a block diagram illustrating a configuration according to a first embodiment of the present invention.
Figure 3:
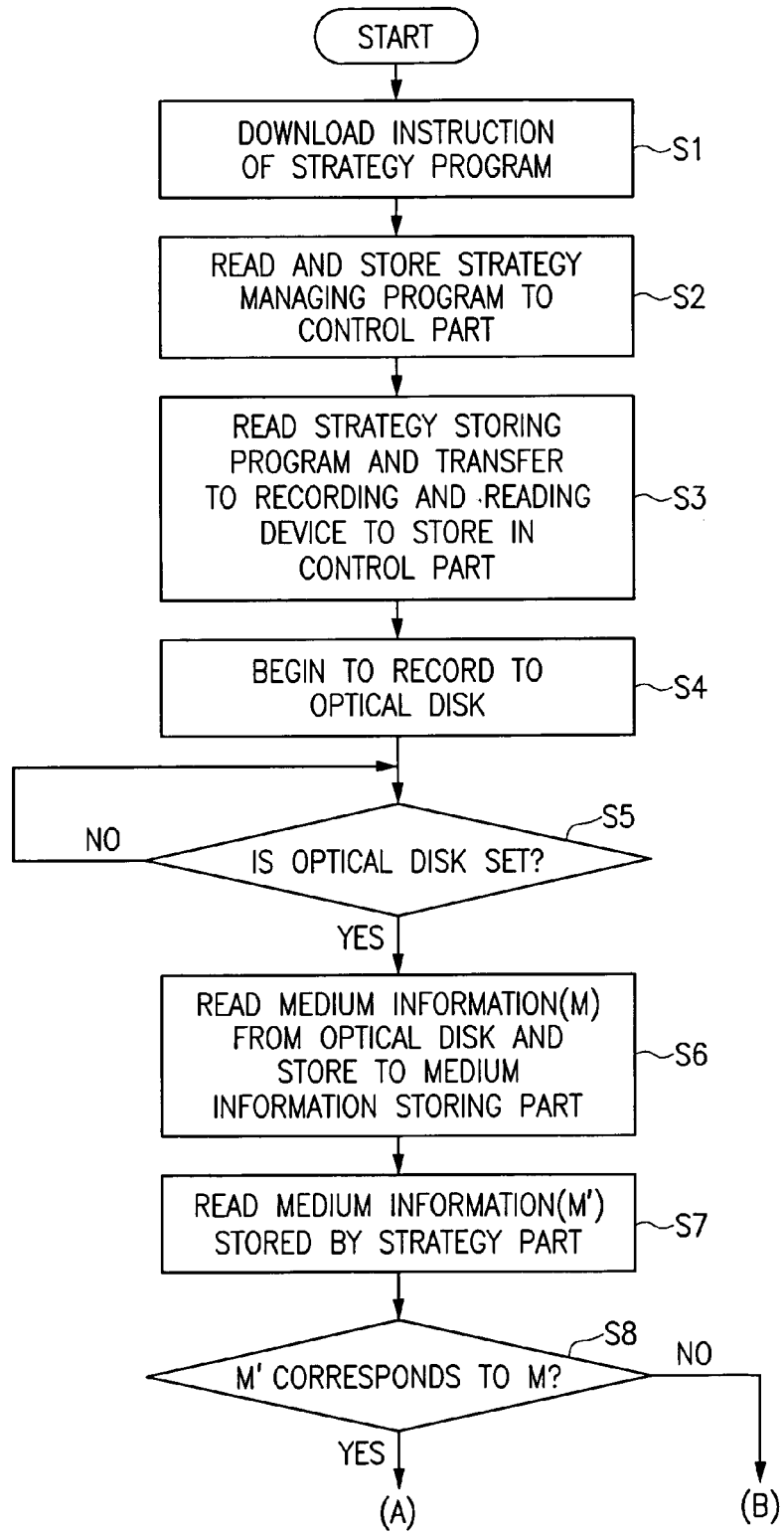
FIG. 3 is a flow chart explaining for operations according to the first embodiment of the present invention.
Figure 4:
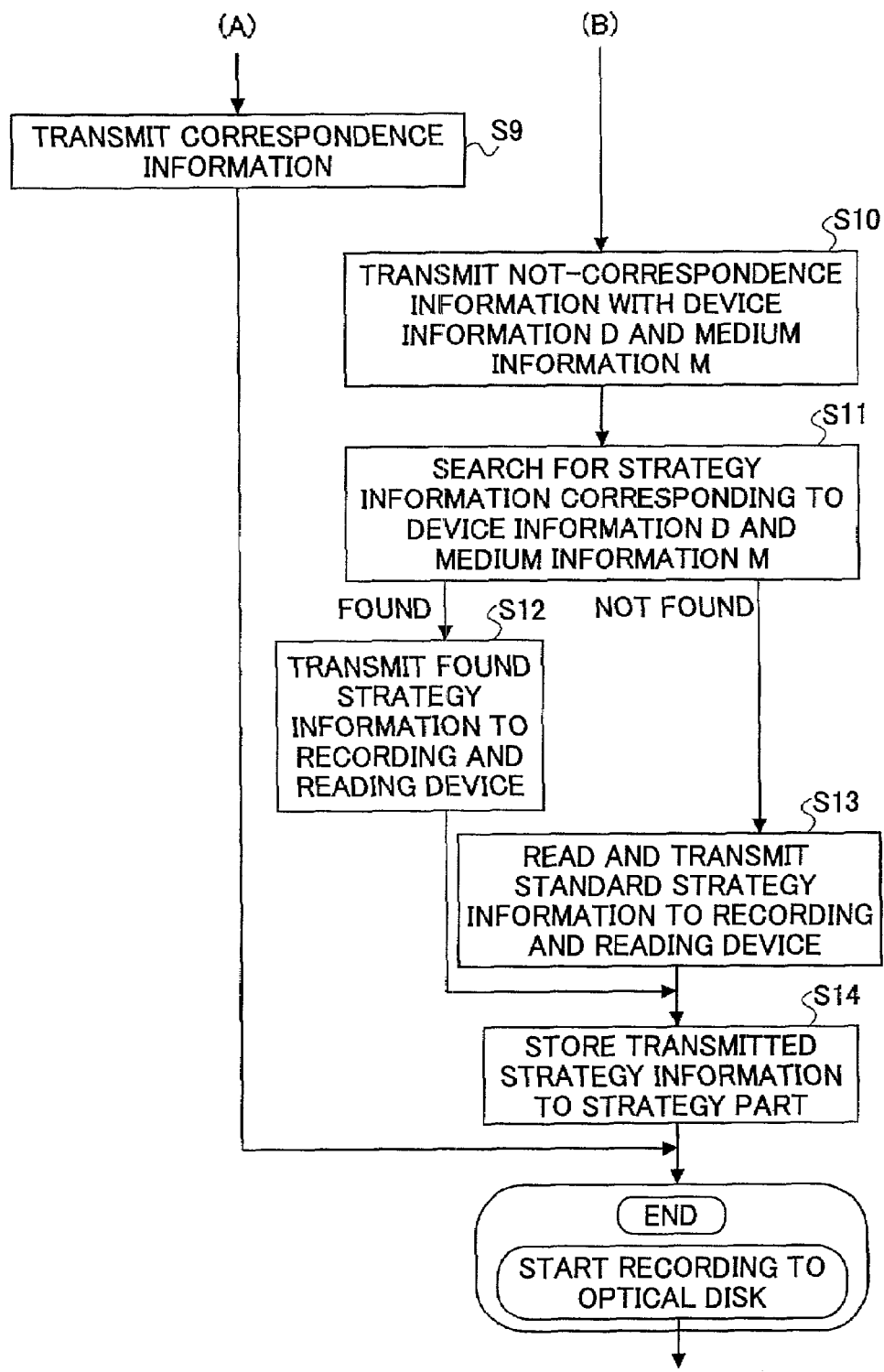
FIG. 4 is a flow chart explaining for operations according to the first embodiment of the present invention.

A first embodiment of the present invention will now be described with reference to FIG. 1 through FIG. 5. FIG. 1 is a block diagram illustrating a configuration according to the first embodiment of the present invention. FIG. 2 is a diagram showing a table example for device information according to the first embodiment of the present invention. FIG. 3 and FIG. 4 are flow charts explaining for operations according to the first embodiment of the present invention. FIG. 5 is a diagram showing a storage example of a strategy part according to the first embodiment of the present invention.

In FIG. 1, information is recorded to an optical disk A, a recording and reading device B is for recording or reading information to or from the optical disk A, and an information processing apparatus C is a personal computer.

The configuration shown in FIG. 1 shows main parts according to the present invention. The recording and reading device B includes a pickup 1 for emitting a light beam so as to write or read information to or from the optical disk A, a writing part 2 for writing information, a reading part 3 for reading the information, a strategy part 4 for conducting a strategy, a medium information storing part 5 for recording medium information of the optical disk A, a device information storing part 6 for recording device information of the recording and reading device B, a control part 7, input and output (I/O) interfaces 8 and 9, and a processor (CPU) part 10.

Also, the information processing apparatus C includes a display part 20, an input part 21, a control part 22, a storing part 23, input and output (I/O) interfaces 27 and 28, and a CPU (Central Processing Unit) 29 for conducting processes.

The storing part 23 includes a strategy managing program 24 for causing the information processing apparatus C to manage strategies (described later), a strategy storing program 25 for causing the recording and reading device B to store strategy information to the strategy part 4, and a strategy information storing part 26 for storing the strategy information.

In the strategy information storing part 26, the strategy information is stored beforehand as shown in FIG. 2, in order to conduct an optimum strategy for device information and medium information.

As the device information shown in FIG. 2, a code, which corresponds to, for example, a manufacturer and a format or a maker name and a format of the recording and reading device B, is used for the device information D specifying the recording and reading device B. Also, as the medium information, information influencing write characteristics such as, for example, the medium information M specifying recording material, is used. The optimum strategy information is stored by corresponding to a combination of the device information D and the recording medium M beforehand.

In addition, a last strategy information S-DM of FIG. 2 is a standard strategy information that is not optimum information but can be used for any recording and reading device and any optical disk.

Moreover, in the device information storing part 6 of the recording and reading device B, the device information D of the recording and reading device B is stored.

Operations will now be described with reference to FIG. 3 and FIG. 4, according to the first embodiment of the present invention.

In step S1, when a power of the information processing apparatus C is turned on, a download instruction of a strategy program is input automatically or by an operator inputting from the input part 21.

In step S2, the strategy managing program 24 stored in the storing part 23 is read and then is stored in a memory (not shown in FIG. 1) of the control part 22.

In step S3, the strategy storing program 25 stored in the storing part 23 is read and then is transmitted to the recording and reading device B through the I/O interface 27 of the information processing apparatus C and the I/O interface 9 of the recording and reading device B. The strategy storing program 25 is stored in a memory (not shown in FIG. 1) of the control part 7.

In step S4, when a recording start instruction to the optical disk A is input by the operator from the input part 21, step S5 is executed. In the step S5, the control part 7 determines whether or not the optical disk A is set to the recording and reading device B. When the control part 7 determines that the optical disk A is not set, the control part 7 waits until the optical disk A is set.

In step S5, the control part 7 instructs the reading part 3 to read the medium information M from the optical disk A and then store the medium information M to the medium information storing part 5.

In the optical disk A, the medium information M specifying a recording material influencing the write characteristics is stored in an area other than an area storing regular information. The medium information M stored in the optical disk A is read and then stored in the medium information storing part 5.

In step S7, the control part 7 reads the medium information M (hereinafter called the medium information M') stored in the strategy part 4 and then advances to step S8. In the step S8, the control part 7 determines whether or not the medium information M read from the optical disk A in step S6 corresponds to the medium information M' read from the strategy part 4.

It should be noted that the strategy part 4 (described later) stores the medium information M and strategy information for conducting a strategy process as shown in FIG. 5.

In step S8, when the control part 7 determines that the medium information M corresponds to the medium information M', the control part 7 advances to step S9. In the step S9, the control part 7 transmits correspondence information showing a correspondence of the medium information M and the medium information M' to the information processing apparatus C.

When the correspondence information is transmitted, the control part 22 of the information processing apparatus C instructs the recording start to record information to the optical disk A. Then, the information is started recording to the optical disk A. That is, the strategy process is conducted based on the strategy information stored in the strategy part 4 and then the information is recorded to the optical disk A.

When the control part 7 determines in the step S8 that the medium information M does not correspond to the medium information M', the control part 7 advances to step S10. In the step S10, the control part 7 transmits not-correspondence information showing a not-correspondence of the medium information M and the medium information M' to the information processing apparatus C with the medium information M stored in the medium information storing part 5 and the device information D stored in the device information storing part 6.

In step S11, the control part 22 of the information processing apparatus C searches for the strategy information corresponding to the medium information M and the device information D transmitted from the recording and reading device B, from the strategy information storing part 26.

In the step S11, when the strategy information is found, the control part 22 advances to step S12. In the step S12, the control part 22 transmits the medium information Mx corresponding to found strategy information (for example, S-DdMx) to the recording and reading device B.

On the other hand, when the strategy information is not found in the step S11, the control part 22 advances to step S13. In the step S13, the control part 22 transmits standard strategy information S-DM stored at a last row in FIG. 2 and the medium information SM, to the recording and reading device B.

In step S14, when the standard strategy information S-DM and the medium information SM are transmitted from the information processing apparatus C, the control part 7 of the recording and reading device B stores the standard strategy information S-DM and the medium information SM to the strategy part 4 (not shown) as shown in FIG. 5. Then, it begins to record information to the optical disk A.

Second Embodiment

Operations will now be described with reference to FIG. 6 and FIG. 7, according to the second embodiment of the present invention.

In the first embodiment, when it is determined that the medium information M read from the optical disk A does not correspond to the medium information M' stored in the strategy part 4, the steps S10 through S14 are conducted and then the strategy information is transmitted from the information processing apparatus C to the recording and reading device B.

Thus, a larger amount of time is required to start recording information to the optical disk A. According to the second embodiment, it is possible to reduce a required amount of time until a recording start.

In the second embodiment, the memory (not shown) of the strategy part 4 in the recording and reading device B can be a non-volatile memory and a plurality of data sets of strategy information are stored in the non-volatile memory as shown in FIG. 6.

After the steps S1 through S6 in FIG. 3 are executed, step S20 is executed as the second embodiment.

In the step S20, the control part 7 determines whether or not the medium information M read from the optical disk A is stored in the strategy part 4. When it is determined that the medium information M read from the optical disk A is stored in the strategy part 4, the control part 7 advances to step S21. In the step S21, the control part 7 records to use the strategy information corresponding to the medium information M when information is recorded to the optical disk A. Then, the control part 7 goes back to the step S9 described in the first embodiment.

On the other hand, when it is determined in the step S20 that the medium information M read from the optical disk A is not stored in the strategy part 4, the control part goes back to the step S10 so as to execute the steps S10 through S13 and then the control part 7 executes the step S23.

In the step S23, the control part 7 additionally stores the medium information M and the strategy information transmitted from the information processing apparatus C to the memory (not shown) of the strategy part 4 in FIG. 6. Subsequently, in step S24, the control part 7 records to use the strategy information additionally stored when information is recorded to the optical disk A. Then, information is begun to record to the optical disk A.

Third Embodiment

A third embodiment of the present invention will now be described with reference to FIG. 8 through FIG. 10.

Figure 7:
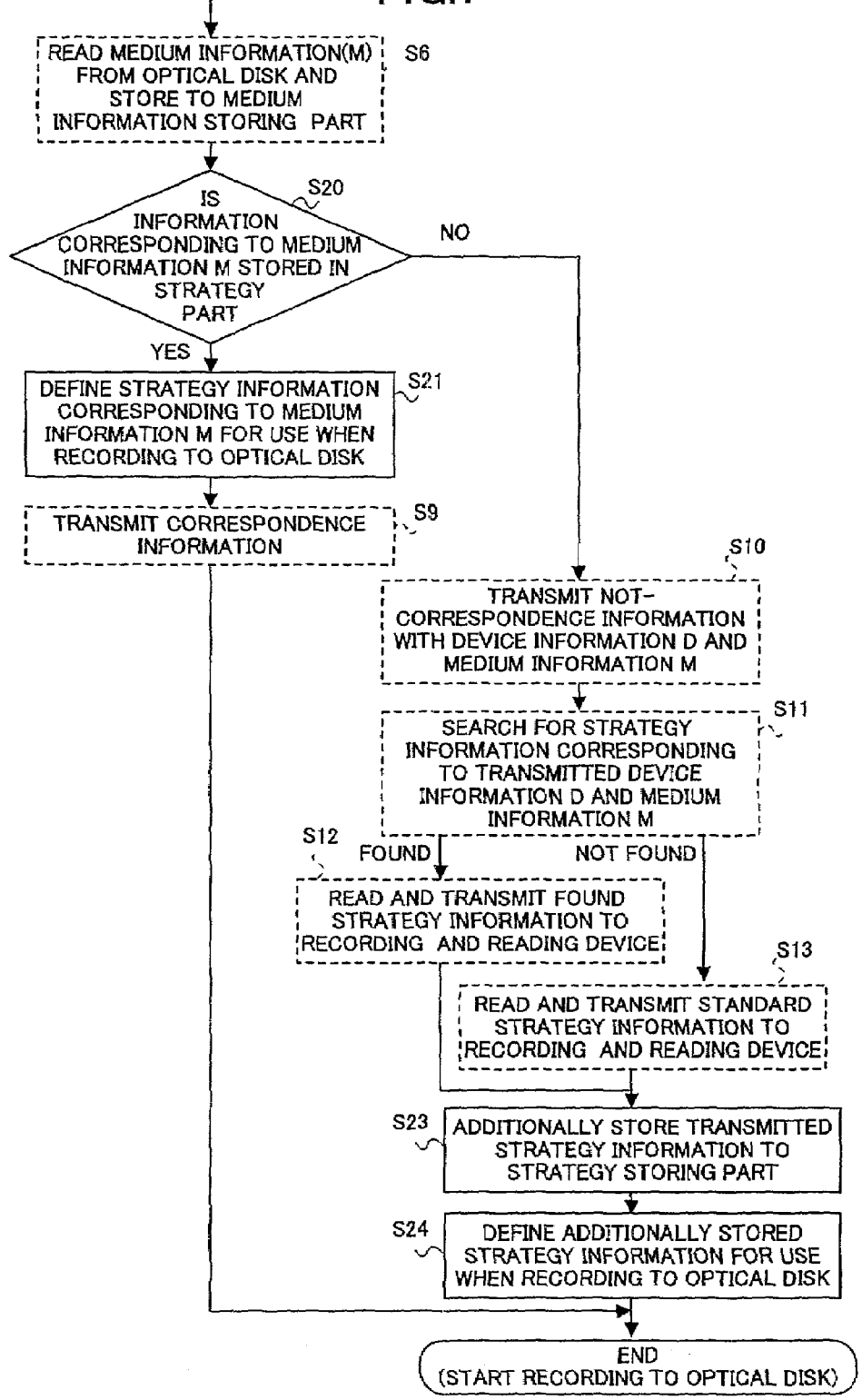
FIG. 7 is a flow chart for explaining operations according to the second embodiment of the present invention.

In the second embodiment, as described in the step S23 in FIG. 7, the medium information M and the strategy information transmitted from the information processing apparatus C is additionally stored in the memory (not shown) of the strategy part 4.

Since a capacity of the memory (not shown) of the strategy part 4 is constant, it is impossible to additionally store information.

According to the third embodiment, when it is impossible to additionally store information, old strategy information stored in the memory is deleted so as to additionally store the information.

In the third embodiment, differently from the first and the second embodiments, registration information as shown in FIG. 8 is additionally provided to the information processing apparatus C and the strategy information storing part 26 described in FIG. 2 and also the registration information as shown in FIG. 9 is additionally provided to the strategy part 4 of the recording and reading device B in FIG. 6.

In addition, when the strategy information described in the step S12 in FIG. 4 is transmitted, the medium information M and registration information are also transmitted and stored with the strategy information.

The registration information additionally provided as shown in FIG. 8 and FIG. 9 is sorted by, for example, a registered date when the strategy information is registered in the strategy information storing part 26, a updated date when the strategy information is updated, a record order of registering the strategy information to the strategy information storing part 26, so as to determine the strategy information in the record order of an older information.

Operations will now be described with reference to FIG. 10 according to the third embodiment of the present invention.

Figure 10:
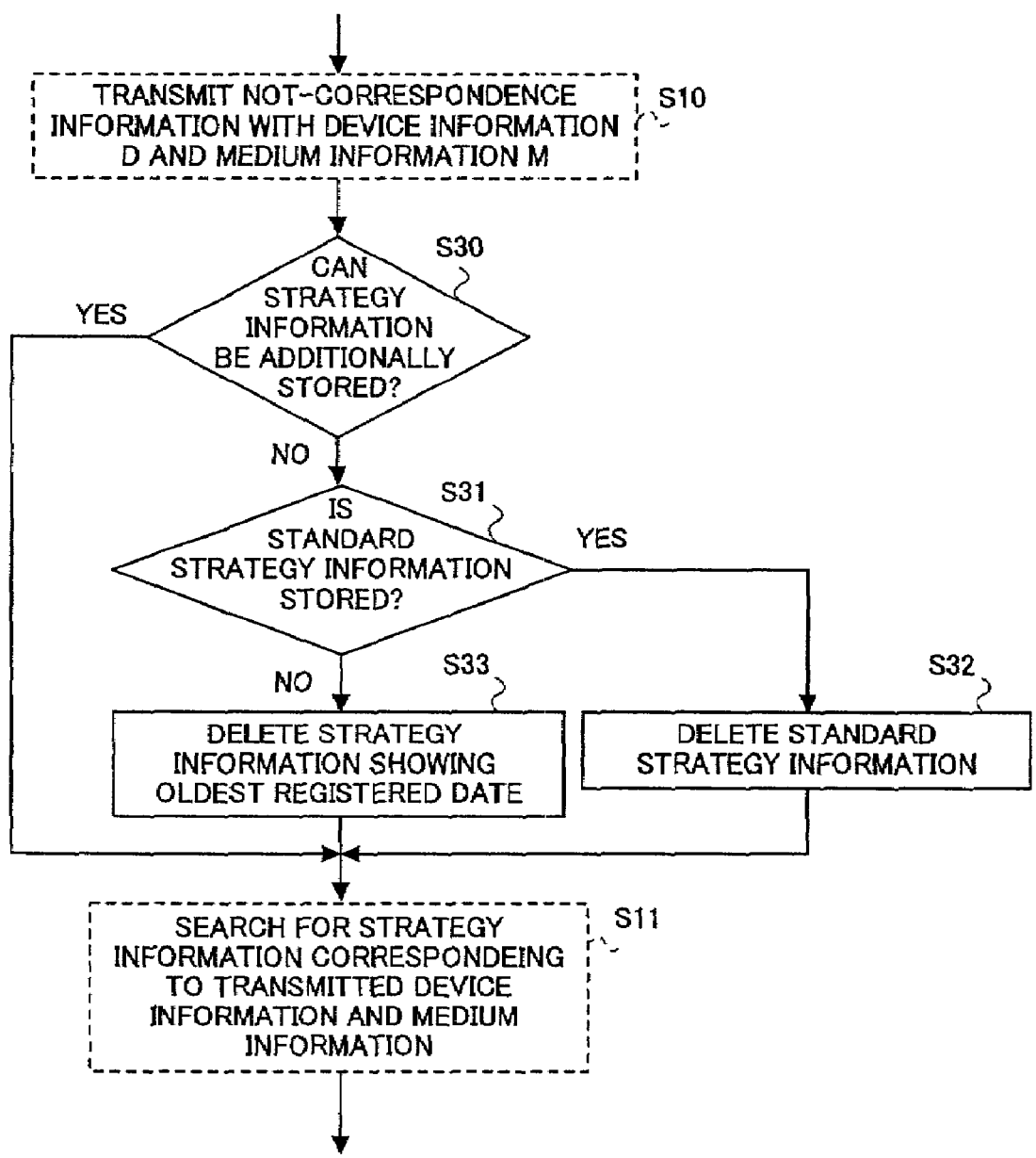
FIG. 10 is a flow chart for explaining operations according to the third embodiment of,the present invention.

Steps S30 through S33 shown in FIG. 10 are inserted between the step S10 and the step S11 in FIG. 7 described in the second embodiment.

In the step S10, when the non-correspondence information is transmitted from the recording and reading device B, the step S30 is executed. In the step S30, the control part 7 determines whether or not it is possible to additionally store the strategy information to the memory (not shown) of the strategy part 4. When it is determined that it is possible to additionally store the strategy information, the control part 7 advances to the step S11.

On the other hand, when it is determined in the step S30 that that it is not possible to additionally store the strategy information, the control part 7 advances to the step S31. In the step S31, the control part 7 determines whether or not standard strategy information is stored in the strategy part 4. When it is determined that the standard strategy information is stored in the strategy part 4, the control part 7 advances to the step S32. In the step S32, the standard strategy information stored in the strategy part 4 is deleted.

On the other hand, when it is determined in the step S31 that the standard strategy information is not stored in the strategy part 4, the control part 7 advances to the step S33. In the step S33, the control part 7 extracts the strategy information showing an oldest registered date or being oldest in the order from the memory (not shown) of the strategy 4 and then deletes extracted strategy information. The control part 7 advances to the step S11.

It should be noted that operations of the recording and reading device B are described in the steps S30 through S33 and operations of the information processing apparatus C are described in the steps S11 through S13. When the correspondence information is transmitted in the step S10, these operations of the recording and reading device B and the information processing apparatus C are conducted in parallel so that information can be recorded immediately after the strategy information is transmitted in the step S12 or S13.

In the third embodiment, as shown in FIG. 8, the registered date or the record order is stored as the registration information in the storage information storing part 26. As shown in FIG. 11, as the registration information, "Yes" when it is permitted to replace or "No" when it is not permitted to replace is stored. Alternatively, for example, a weight value grading to ten levels from 1 for "Yes" to 10 for "No" may be stored as replacement permission information. In the step S33 in FIG. 10, the registration information showing "Yes" or lowest weight in the ten levels may be deleted.

In this case, the registration information stored in the memory (not shown) of the strategy part 4 can be the replacement permission information as shown in FIG. 12.

Fourth Embodiment

A fourth embodiment will now be described with reference to FIG. 13 through FIG. 15 according to the present invention.

In the third embodiment, as described in the step S33 of FIG. 10, the strategy information is searched for based on the registered date or the replacement permission information. However, there is a problem in that the same registered date or the same replacement permission information may be stored. In the fourth embodiment, the above problem can be eliminated.

Differently from the third embodiment, an area for storing a use number is provided in the memory (not shown) of the strategy part 4 as shown in FIG. 13 or FIG. 14 in the fourth embodiment.

The use number is incremented as the strategy information is used each time the strategy information is recorded to the optical disk A.

That is, the use number is incremented by 1 each time the strategy information is determined to use when information is recorded to the optical disk A in the steps S21 through S21 in FIG. 7.

Operations will now be described with reference to FIG. 15 according to the fourth embodiment of the present invention.

Figure 15:
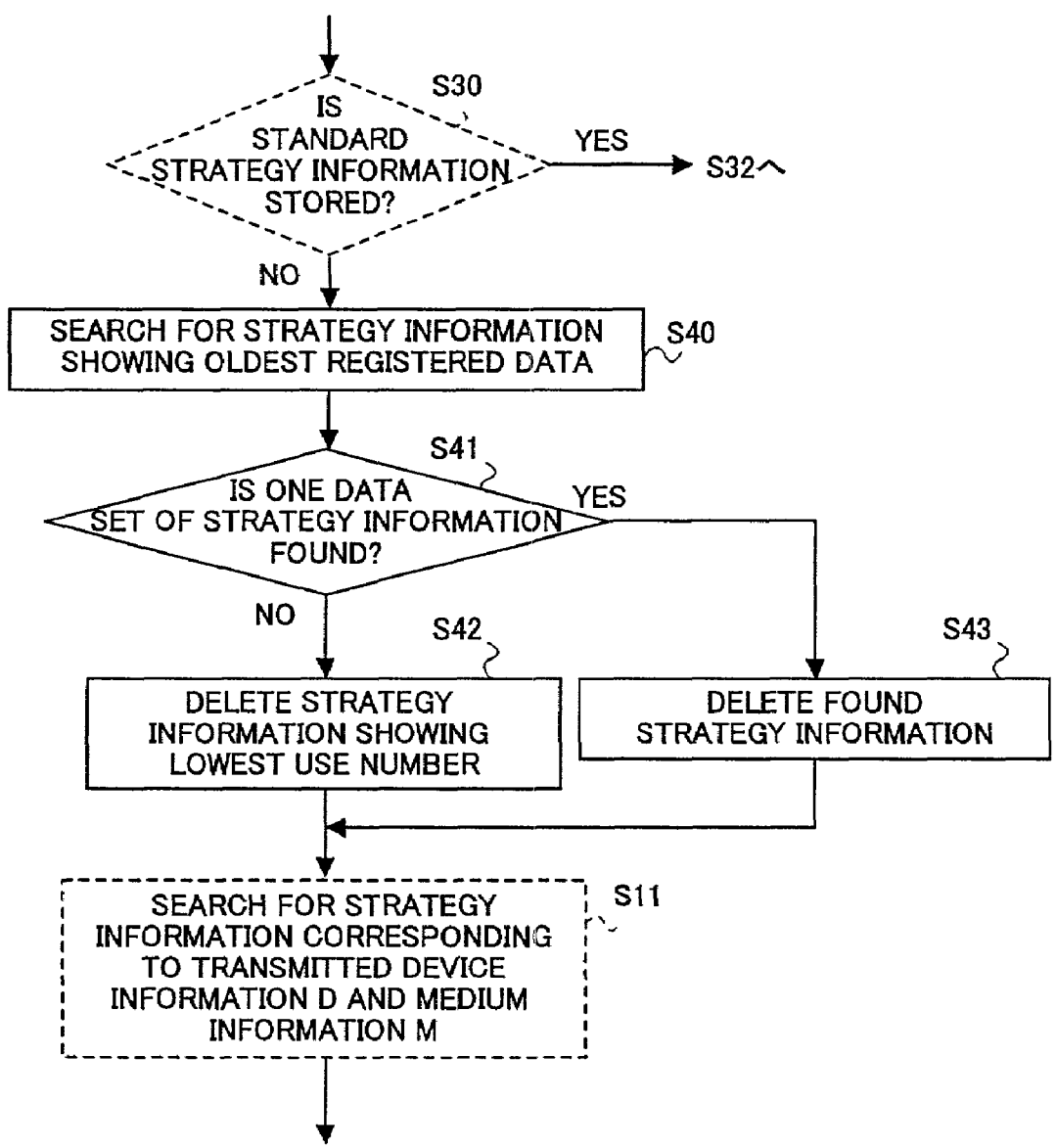
FIG. 15 is a flow chart for explaining operations according to the fourth embodiment of the present invention.

Steps S40 through S43 shown in FIG. 15 for the fourth embodiment are executed, instead of executing the steps S33 described in FIG. 10 for the third embodiment.

In the step S40, the control part 7 searches for the strategy information showing the oldest registered date.

In step S41, the control part 7 determines whether or not one data set of the strategy information is found. When it is determined that not one data set of the strategy information is found, that is, a plurality of data sets of the strategy information are found, the control part 7 advances to step S42. In the step S42, the strategy information showing the lowest use number is deleted and the control part 7 goes back to the step S11.

On the other hand, when it is determined that only one data set of the strategy information is found, the found strategy information is deleted and then the control part 7 goes back to the step S11.

For example, when the registered date is stored as the registration information as shown in FIG. 13, the registration information showing "1999.05", which is the oldest date for the medium information M3 and M5, is found in the step S40.

In this case, in step S42, since the use number for the medium information M3 and the use number shows "400" and the use number for the medium information M5 shows "300", the strategy information M5 showing the lowest use number "300" is deleted.

Alternatively, as shown in FIG. 14, when the replacement permission information is stored as the registration information, the strategy information showing "Yes" is searched for in the step S40. When a plurality of data sets of the strategy information showing "Yes" are found, the strategy information showing the lowest use number is deleted.

According to the present invention, the optimum strategy information for the recording and reading device B and the optical disk A as a recording medium is selected and transmitted from the information processing apparatus C in that the strategy information is used when the recording and reading device B records information to the optical disk A. Therefore, it is possible to optimize to record information.

The present invention is not limited to the specifically disclosed embodiments, and variations and modifications may be made without departing from the scope of the present invention.

The present application is based on the Japanese priority applications No. 2000-245601 filed on Aug. 14, 2000, entire contents of which are hereby incorporated by reference.

What is claimed is:

1. A method for optically recording information in a system comprising a recording and reading device that includes a strategy part for conducting a strategy when optically recording information and an information processing apparatus that includes a strategy information storing part storing the strategy information for operating said strategy part, said method comprising the steps of:
   (a) reading said strategy information for operating said strategy part of said recording and reading device from said strategy information storing part of said information processing apparatus;
   (b) transmitting said strategy information read in said step (a) to said recording and reading device;
   wherein a plurality of data sets of the strategy information is stored in said strategy part;
   (c) storing registration information in addition to device information and medium information to said strategy information storing part;
   (d) transmitting said registration information additionally provided to said medium information to said recording and reading device and storing said medium information with said registration information to said strategy part, when said strategy information is transmitted from said information processing apparatus to said recording and reading device;
   (e) determining said strategy information, which is stored in said strategy part, to be deleted based on said registration information stored in said strategy part and deleting determined strategy information, when said strategy information transmitted from said in formation processing apparatus cannot be stored because of a shortage of a recording capacity of said strategy; and (f) storing said strategy information transmitted from said information processing apparatus.

2. The method as claimed in claim 1, wherein:

said step (c) stores a registered date when said strategy information is registered, as said registration information to said strategy information storing part; and said step (e) deletes said strategy information showing an oldest registered date from said strategy part.

3. The method as claimed in claim 1, wherein said step (e) weights said registration information and deletes said strategy information based on a weight from said strategy part.

4. The method as claimed in claim 1, further comprising the step of (g) storing a use number showing how many times the strategy information is used each time said strategy information stored in said strategy part is used when information is recorded to the optical recording medium, wherein said step (e) determines the strategy information to be deleted based on said registration information and said use number when said strategy information is deleted.

5. A computer-readable recording medium recorded with program code for causing a computer to optically record information in a system comprising a recording and reading device that includes a strategy part for conducting a strategy when optically recording information and an information processing apparatus that includes a strategy information storing part storing the strategy information for operating said strategy part, said program comprising the codes for:

(a) reading said strategy information for operating said strategy part of said recording and reading device from said strategy information storing part of said information processing apparatus;

(b) transmitting said strategy information read by said code (a) to said recording and reading device;

(c) transmitting device information and medium information from said recording and reading device to said information processing apparatus;

(d) reading said strategy information corresponding to said device information and medium information from said strategy information storing part in said information processing apparatus;

(e) transmitting said strategy information with said medium information to said recording and reading device;

(f) reading standard strategy information and transferring said standard strategy information to said recording and reading apparatus when the strategy information corresponding to the device information and the medium information transmitted from said recording and reading device is not stored in said strategy information storing part, wherein said code (f) cancels transmitting said device information and said medium information to said information processing apparatus when said medium information additionally provided to said strategy information stored in said strategy part corresponds to said medium information of said optical recording medium, and activates said strategy part to record to the optical recording medium;

(g) transmitting said registration information additionally provided to said medium information to said recording and reading device and storing said medium information with said registration information to said strategy part, when said strategy information is transmitted from said information processing apparatus to said recording and reading device;

(h) determining said strategy information, which is stored in said strategy part, to be deleted based on said registration information stored in said strategy part and deleting determined strategy information, when said strategy information transmitted from said information processing apparatus can not be stored because of a shortage of a recording capacity of said strategy; and (i) storing said strategy information transmitted from said information processing apparatus.

6. The computer-readable recording medium claimed in claim 5, further comprising the code for:

(j) storing registration information in addition to said device information and said medium information to said strategy information storing part;

wherein said code (j) stores a registered date when said strategy information is registered, as said registration information to said strategy information storing part; and said code (h) deletes said strategy information showing an oldest registered date from said strategy part.

7. The computer-readable recording medium claimed in claim 5, further comprising the code for (k) storing a use number showing how many times the strategy information is used each time said strategy information stored in said strategy part is used when information is recorded to the optical recording medium, wherein said code (h) determines the strategy information to be deleted based on said registration information and said use number when said strategy information is deleted.

8. The computer-readable recording medium claimed in claim 5, wherein said code (h) weights said registration information and deletes said strategy information based on a weight from said strategy part.

* * * * *